UNITED STATES PATENT OFFICE.

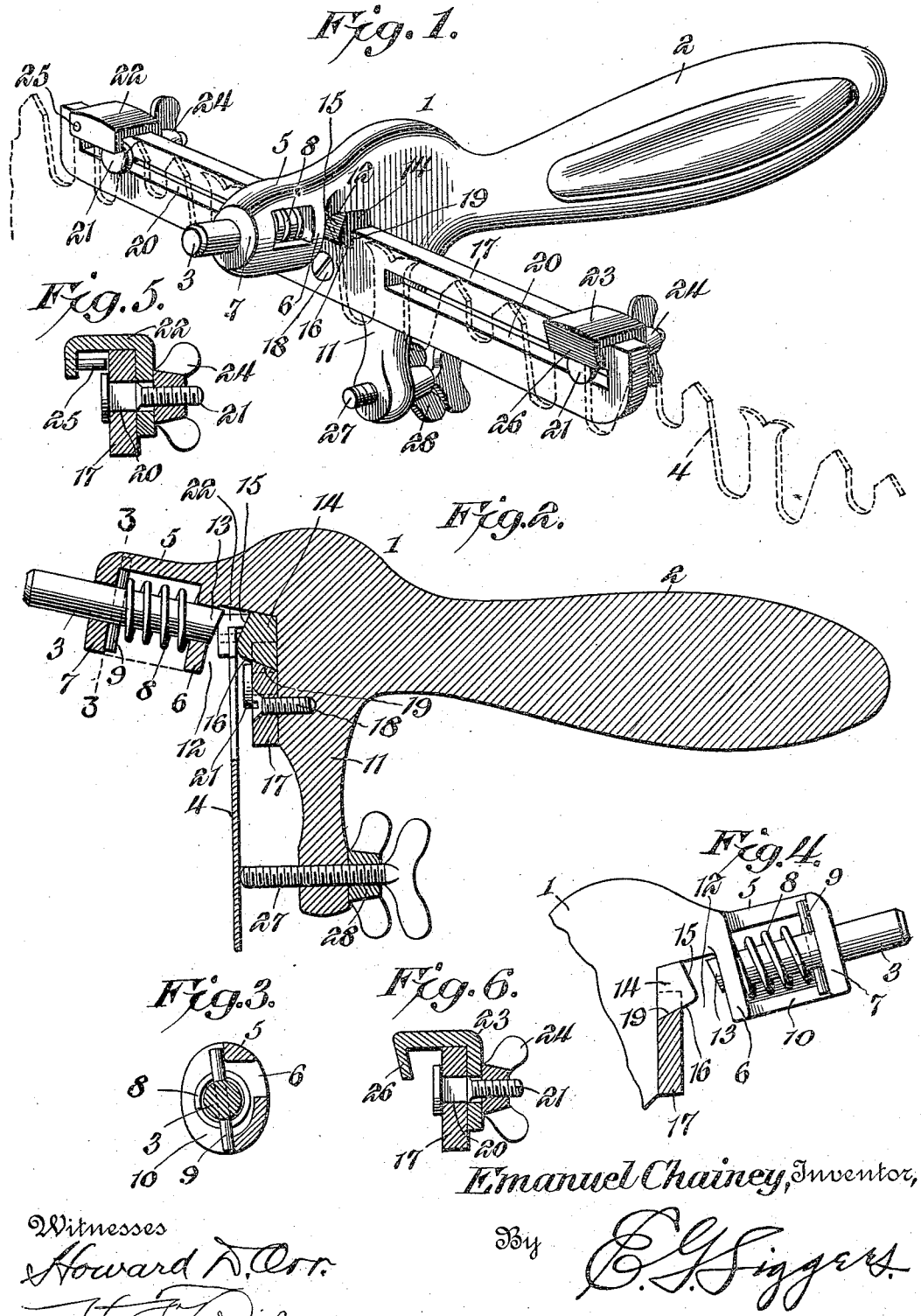

EMANUEL CHAINEY, OF FLORENCE, WISCONSIN, ASSIGNOR TO FLORENCE MFG. CO., OF FLORENCE, WISCONSIN, A CORPORATION OF WISCONSIN.

SAW-SET.

944,174.  Specification of Letters Patent.  Patented Dec. 21, 1909.

Application filed January 17, 1908. Serial No. 411,291.

*To all whom it may concern:*

Be it known that I, EMANUEL CHAINEY, a citizen of the United States, residing at Florence, in the county of Florence and State of Wisconsin, have invented a new and useful Saw-Set, of which the following is a specification.

The invention relates to improvements in saw sets.

The object of the present invention is to improve the construction of saw sets, more especially that shown and described in Patent No. 838,843, and to simplify and cheapen the construction of the same and to render the saw set more durable.

A further object of the invention is to arrange the parts so that the body will absorb the blow of a hammer, and thereby reduce the rebounding of the device to a minimum.

The invention also has for its object to enable the saw set to be quickly and accurately applied to and adjusted along a saw blade.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a hand saw set, constructed in accordance with this invention, and shown applied to a saw blade, the latter being illustrated in dotted lines. Fig. 2 is a longitudinal sectional view of the same, the saw blade being shown in full lines. Fig. 3 is a detail sectional view, taken substantially on the line 3—3 of Fig. 2, and illustrating the manner of mounting the punch. Fig. 4 is a side elevation of a portion of the body, showing the punch in full lines and the gage-supporting plate in section. Figs. 5 and 6 are detail sectional views, illustrating the construction of the gages.

Like numerals of reference designate corresponding parts in all the figures of the drawings.

The body 1 of the saw set, which is made heavier than that of the said patent, is provided with a projecting handle 2, which in practice will be arranged in a horizontal position, as illustrated in Figs. 1 and 2 of the drawing, in which the saw set is shown in its normal position in connection with a vertical saw blade. The punch 3 is arranged longitudinally of the body 1 in substantial alinement with the handle, and in practice it will occupy substantially a horizontal position instead of being vertically disposed as in the said patent. This arrangement not only simplifies the device shown in the said patent, but the blows of the hammer are delivered sidewise with respect to the blade and are absorbed by the handle, which is arranged opposite the punch, and the liability of the device to rebound under the blows of a hammer is reduced to a minimum. The punch 3, which is round, is mounted in a guide 5, disposed longitudinally of the body and provided with spaced guiding portions 6 and 7. The punch is automatically moved outward by means of a coiled spring 8, arranged between the guiding portions 6 and 7 and engaging the guiding portion 6 and a guide pin 9 piercing the round punch and operating in a recess 10 at one side of the guide. The recess 10 forms upper and lower straight guide faces, which are engaged by the ends of the pin 9, and the latter prevents rotary movement of the punch and limits the outward movement thereof.

The body is provided at an intermediate point with a depending arm 11, and it has a recess 12, arranged at the upper end of the arm and at the inner end of the guide 5 to enable the saw set to be placed over a saw blade in position for the punch to engage the teeth of the blade. The inner tooth engaging end face 13 of the punch is arranged at an angle, and it coöperates with an anvil or die 14 to impart the proper set to a tooth. The anvil is provided with an inclined or angularly disposed tooth-receiving face 15, arranged opposite the tooth engaging end of the punch, as clearly shown in Fig. 2 of the drawing.

The anvil or die, which consists of a block, is fitted in the recess 12 against the upper and rear walls thereof and it is provided with an inclined lower edge 16, which is engaged by a gage supporting plate or member 17, secured to the body of the device by a screw 18 and provided at its upper edge with a recess 19 to fit the anvil or die. The bottom edge of the recess 19 is inclined to fit the inclined edge of the anvil or die, and the latter is embraced at its bottom and side edges by the gage-supporting plate or member, whereby the anvil or die is securely fastened to the body.

The gage-supporting plate or member, which extends longitudinally of the saw blade and transversely with relation to the body, is provided at opposite sides of the latter with longitudinal slots 20, receiving screws 21 for securing gages 22 and 23 to the plate or member 17. The screws, which have enlarged rounded heads, are provided with thumb nuts 24 and are adapted to clamp the gages at any point along the longitudinal slots 20 of the plate or member 17. The gage 22, which is approximately inverted U-shaped, has its inner or rear side extended below the outer side and provided with a perforation to receive the set screw 21. The outer or front side of the gage carries an inwardly extending transversely disposed pin 25, arranged to engage the teeth of the saw blade for enabling the device to be quickly and accurately applied to and adjusted along the same. The pin 25, which is arranged transversely with relation to the saw blade and also to the gage supporting bar or member 17, is adapted to be positioned to engage one of the teeth of the saw blade, and it will facilitate the accurate placing of the saw set in the blade with its punch and anvil in proper position with relation to the teeth to be set. The other gage 23 is approximately inverted U-shaped and its outer or front side 26 is arranged at an inclination, and extends downwardly and inwardly to cause the gage to clear the curved portions of the drag teeth of the saw blade to prevent the drag teeth from being accidentally injured by the device. The depending arm 11 of the body carries an adjusting screw 27, mounted in a threaded perforation of the arm 11 and provided with a jam or locking nut 28. The adjusting screw 27 projects forwardly from the lower portion of the depending arm, and is adapted to maintain the saw set with the face of the anvil or die in proper position with relation to the tooth to be set.

Having thus fully described my invention, what I claim as new and desire to secure by Letters Patent, is:—

1. A saw set comprising a body, a punch mounted thereon, a gage-supporting member, and an approximately inverted U-shaped gage mounted on the said member and provided with an interiorly arranged pin disposed transversely of the gage in position for engaging the teeth of the saw.

2. A saw set comprising a body, a punch mounted thereon, a gage supporting member extending from opposite sides of the body, an approximately U-shaped gage mounted on the said member at one side of the body and having an outer or front side arranged at an angle and extending downwardly and inwardly to engage the teeth of a saw at the outer face thereof, and another approximately U-shaped gage mounted on the member at the opposite side of the body and provided with an inwardly projecting portion arranged to engage the teeth of a saw at the cutting edges thereof to position the saw set on the saw.

In testimony that I claim the foregoing as my own I have hereto affixed my signature in the presence of two witnesses.

EMANUEL CHAINEY.

Witnesses:
GEORGE GROGAN,
JOHN W. MALLOY.